United States Patent
Endresen et al.

(10) Patent No.: US 12,380,666 B2
(45) Date of Patent: Aug. 5, 2025

(54) COMPRESSED FIXED-POINT SIMD MACROBLOCK ROTATION SYSTEMS AND METHODS

(71) Applicant: FLIR Unmanned Aerial Systems AS, Hvalstad (NO)

(72) Inventors: Lars Petter Endresen, Nesoddtangen (NO); Øystein Hovind, Hvalstad (NO)

(73) Assignee: FLIR UNMANNED AERIAL SYSTEMS AS, Hvalstad (NO)

( * ) Notice: Subject to any disclaimer, the term of this patent is extended or adjusted under 35 U.S.C. 154(b) by 313 days.

(21) Appl. No.: 17/959,952

(22) Filed: Oct. 4, 2022

(65) Prior Publication Data
US 2023/0105192 A1    Apr. 6, 2023

Related U.S. Application Data

(60) Provisional application No. 63/252,568, filed on Oct. 5, 2021.

(51) Int. Cl.
*G06V 10/24* (2022.01)

(52) U.S. Cl.
CPC .................. *G06V 10/242* (2022.01)

(58) Field of Classification Search
CPC .................................................. G06V 10/242
See application file for complete search history.

(56) References Cited

U.S. PATENT DOCUMENTS

| | | | |
|---|---|---|---|
| 5,111,192 A | 5/1992 | Kadakia | |
| 7,376,286 B2 | 5/2008 | Locker et al. | |
| 8,463,837 B2 * | 6/2013 | Chen | G06F 17/147 708/603 |
| 8,797,359 B2 | 8/2014 | Tripathi et al. | |
| 9,143,799 B2 * | 9/2015 | Endresen | H04N 19/523 |
| 9,544,451 B2 * | 1/2017 | Silverbrook | H04N 1/00326 |
| 9,756,360 B2 * | 9/2017 | Joshi | H04N 19/129 |
| 10,339,664 B2 * | 7/2019 | Rhoads | G06T 7/33 |
| 10,735,659 B2 | 8/2020 | Messely et al. | |

(Continued)

FOREIGN PATENT DOCUMENTS

WO    WO 2020247212 A1    12/2020

OTHER PUBLICATIONS

S. A. Fahmy, C.-s. Bouganis, P. Y. k. Cheung and W. Luk, "Efficient Realtime FPGA Implementation of the Trace Transform," 2006 International Conference on Field Programmable Logic and Applications, Madrid, Spain, 2006, pp. 1-6, (Year: 2006)*

(Continued)

*Primary Examiner* — Stephen R Koziol
*Assistant Examiner* — Dylan J Sherrillo
(74) *Attorney, Agent, or Firm* — Haynes and Boone, LLP (57) ABSTRACT

Various techniques are provided for efficient bilinear interpolation of rotated pixels. In one example, a method includes identifying a rotation angle for an image; performing a vector load of pixel positions for the image at the rotation angle; performing a vector load of rows of pixels associated with the pixel positions; performing a vector selection of a subset of pixels from the rows of pixels based on the identified pixel positions; performing a vector load of a set of coefficients at the rotation angle; and applying the set of coefficients to the subset of pixels to determine an updated value for the image. Additional methods and systems are also provided.

20 Claims, 5 Drawing Sheets

(56) References Cited

U.S. PATENT DOCUMENTS 11,184,617 B2 * 11/2021 Egilmez .............. H04N 19/132
2005/0094899 A1 * 5/2005 Kim ...................... G06T 3/403
     382/300
2013/0300769 A1 11/2013 Huang et al.

OTHER PUBLICATIONS

M. K. Rahman, M. H. Sujon and A. Azad, "FusedMM: A Unified SDDMM-SpMM Kernel for Graph Embedding and Graph Neural Networks," 2021 IEEE International Parallel and Distributed Processing Symposium (IPDPS), Portland, OR, USA, 2021, pp. 256-266, (Year: 2021).*

Arabnia et al., "Arbitrary rotation of raster images with SIMD machine architectures", Computer Graphics Forum, Mar. 1, 1987, p. 3-11, vol. 6, Blackwell Publishing Ltd, Oxford, United Kingdom.

Danielsson et al., "High-Accuracy Rotation of Images", CVGIP: Graphical Models and Image Processing, Jul. 1992, p. 340-344, vol. 54, No. 4, Elsevier, Amsterdam, Netherlands.

Ramesh et al., "Optimization and Evaluation of Image-and Signal-Processing Kernels on the TI C6678 Multi-Core DSP" 2014 IEEE High Performance Extreme Computing Conference (HPEC), Sep. 2014, p. 1-6, IEEE, Waltham, MA, United States of America.

Zuo, Song, "Fast Data-Parallel Rendering of Digital Volume Images", Thesis, Jun. 1995, 81 pages, The Chinese University of Hong Kong, Hong Kong, China.

* cited by examiner

```
p[0][0] = TBL ({ M0[3], M0[4], M0[5] }, POS[0])
p[0][1] = TBL ({ M0[3], M0[4], M0[5] }, POS[1])
p[0][2] = TBL ({ M0[5], M0[6], M0[7] }, POS[2])
p[0][3] = TBL ({ M0[5], M0[6], M0[7] }, POS[3])
p[1][0] = TBL ({ M1[3], M1[4], M1[5] }, POS[0])
p[1][1] = TBL ({ M1[3], M1[4], M1[5] }, POS[1])
p[1][2] = TBL ({ M1[5], M1[6], M1[7] }, POS[2])
p[1][3] = TBL ({ M1[5], M1[6], M1[7] }, POS[3])
p[2][0] = TBL ({ M2[3], M2[4], M2[5] }, POS[0])
p[2][1] = TBL ({ M2[3], M2[4], M2[5] }, POS[1])
p[2][2] = TBL ({ M2[5], M2[6], M2[7] }, POS[2])
p[2][3] = TBL ({ M2[5], M2[6], M2[7] }, POS[3])
p[3][0] = TBL ({ M3[3], M3[4], M3[5] }, POS[0])
p[3][1] = TBL ({ M3[3], M3[4], M3[5] }, POS[1])
p[3][2] = TBL ({ M3[5], M3[6], M3[7] }, POS[2])
p[3][3] = TBL ({ M3[5], M3[6], M3[7] }, POS[3])
r[0][0] = UDOT (128, p[0][0], COF[0])
r[0][1] = UDOT (128, p[0][1], COF[1])
r[0][2] = UDOT (128, p[0][2], COF[2])
r[0][3] = UDOT (128, p[0][3], COF[3])
r[1][0] = UDOT (128, p[1][0], COF[0])
r[1][1] = UDOT (128, p[1][1], COF[1])
r[1][2] = UDOT (128, p[1][2], COF[2])
r[1][3] = UDOT (128, p[1][3], COF[3])
r[2][0] = UDOT (128, p[2][0], COF[0])
r[2][1] = UDOT (128, p[2][1], COF[1])
r[2][2] = UDOT (128, p[2][2], COF[2])
r[2][3] = UDOT (128, p[2][3], COF[3])
r[3][0] = UDOT (128, p[3][0], COF[0])
r[3][1] = UDOT (128, p[3][1], COF[1])
r[3][2] = UDOT (128, p[3][2], COF[2])
r[3][3] = UDOT (128, p[3][3], COF[3])
Q0 = TBL(r[0], RM[0])
Q1 = TBL(r[1], RM[1])
Q2 = TBL(r[2], RM[2])
Q3 = TBL(r[3], RM[3])
ST2(dst + 0, {Q0, Q1})
ST2(dst + 8, {Q3, Q2})
```

FIG. 3

|   |   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|----|----|----|----|----|----|
|   |   |   |   |   |   |   |   |   |   |   |   |    |    |    |    |    |    |
| 0 |   | 0 | 1 | 2 | 3 | 4 | 5 | 6 | 7 | 8 | 9 | 10 | 11 | 12 | 13 | 14 | 15 |
| 1 |   | 16 | 17 | 18 | 19 | 20 | 21 | 22 | 23 | 24 | 25 | 26 | 27 | 28 | 29 | 30 | 31 |
| 2 |   | 32 | 33 | 34 | 35 | 36 | 37 | 38 | 39 | 40 | 41 | 42 | 43 | 44 | 45 | 46 | 47 |
| 3 |   | 48 | 49 | 50 | 51 | 52 | 53 | 54 | 55 | 56 | 57 | 58 | 59 | 60 | 61 | 62 | 63 |
| 4 |   | 64 | 65 | 66 | 67 | 68 | 69 | 70 | 71 | 72 | 73 | 74 | 75 | 76 | 77 | 78 | 79 |
| 5 |   | 80 | 81 | 82 | 83 | 84 | 85 | 86 | 87 | 88 | 89 | 90 | 91 | 92 | 93 | 94 | 95 |
| 6 |   | 96 | 97 | 98 | 99 | 100 | 101 | 102 | 103 | 104 | 105 | 106 | 107 | 108 | 109 | 110 | 111 |
| 7 |   | 112 | 113 | 114 | 115 | 116 | 117 | 118 | 119 | 120 | 121 | 122 | 123 | 124 | 125 | 126 | 127 |
| 8 |   | 128 | 129 | 130 | 131 | 132 | 133 | 134 | 135 | 136 | 137 | 138 | 139 | 140 | 141 | 142 | 143 |
| 9 |   | 144 | 145 | 146 | 147 | 148 | 149 | 150 | 151 | 152 | 153 | 154 | 155 | 156 | 157 | 158 | 159 |
| 10 |   | 160 | 161 | 162 | 163 | 164 | 165 | 166 | 167 | 168 | 169 | 170 | 171 | 172 | 173 | 174 | 175 |
| 11 |   | 176 | 177 | 178 | 179 | 180 | 181 | 182 | 183 | 184 | 185 | 186 | 187 | 188 | 189 | 190 | 191 |
| 12 |   | 192 | 193 | 194 | 195 | 196 | 197 | 198 | 199 | 200 | 201 | 202 | 203 | 204 | 205 | 206 | 207 |
| 13 |   | 208 | 209 | 210 | 211 | 212 | 213 | 214 | 215 | 216 | 217 | 218 | 219 | 220 | 221 | 222 | 223 |
| 14 |   | 224 | 225 | 226 | 227 | 228 | 229 | 230 | 231 | 232 | 233 | 234 | 235 | 236 | 237 | 238 | 239 |
| 15 |   | 240 | 241 | 242 | 243 | 244 | 245 | 246 | 247 | 248 | 249 | 250 | 251 | 252 | 253 | 254 | 255 |

COMPRESSED FIXED-POINT SIMD MACROBLOCK ROTATION SYSTEMS AND METHODS

CROSS REFERENCE TO RELATED APPLICATIONS

This application claims priority to and the benefit of U.S. Provisional Patent Application No. 63/252,568 filed Oct. 5, 2021 and entitled "COMPRESSED FIXED-POINT SIMD MACROBLOCK ROTATION SYSTEMS AND METHODS," which is incorporated herein by reference in its entirety.

TECHNICAL FIELD

The present invention relates generally to image processing and, more particularly, to image processing techniques with improved efficiency.

BACKGROUND

The processing of graphical or image data in a computer or other data processing system is often extremely computationally expensive, requiring significant memory and processor resources. In many data processing systems, images are represented by arrays of pixel elements, or "pixels," with each pixel having a "color depth" that defines the total number of color variations that may be represented in each pixel. As the resolution and/or color depth of an image is increased, the perceived quality of an image, which may be reflected in terms of realism, accuracy, sharpness, vibrancy, etc., also increases. Thus, a continuing need has existed for data processing system support of images with increased resolution and/or color depth.

As a general rule, the greater the resolution and/or color depth of an image, the greater amount of image data that is used to represent the image. Moreover, as the amount of image data used to represent an image increases, the amount of computer resources used to store, transmit, and manipulate the image also increases.

One specific type of graphic manipulation that typically requires substantial computational resources is that of image rotation. Image rotation has a number of useful benefits such as in converting images between landscape and portrait orientations for display, faxing, copying, and printing purposes. Also, computer aided design, graphics design, image processing and other video and graphical development environments often utilize image rotation to manipulate image data in a user-created document. Moreover, it is envisioned that as hand-held electronic devices become more prevalent, a need will exist for more flexible displays that are capable of displaying an image at different viewing angles to accommodate multiple form factors for a device.

SUMMARY

Efficient bilinear interpolation of rotated pixels in an image is provided by combining several mandatory pixel permutations in a variety of novel ways, thereby minimizing the number of operations utilized to complete the calculations and simplifying the process of vectorizing.

In one embodiment, a method includes identifying a rotation angle for an image; performing a vector load of pixel positions for the image at the rotation angle; performing a vector load of rows of pixels associated with the pixel positions; performing a vector selection of a subset of pixels from the rows of pixels based on the identified pixel positions; performing a vector load of a set of coefficients at the rotation angle; and applying the set of coefficients to the subset of pixels to determine an updated value for the image.

In another embodiment, a system includes a memory component storing machine-executable instructions; and a logic device configured to execute the instructions to cause the system to: identify a rotation angle for an image; perform a vector load of pixel positions for the image at the rotation angle; perform a vector load of rows of pixels associated with the pixel positions; perform a vector selection of a subset of pixels from the rows of pixels based on the identified pixel positions; perform a vector load of a set of coefficients at the rotation angle; and apply the set of coefficients to the subset of pixels to determine an updated value for the image.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 3 illustrates an exemplary sequence of instructions associated with the process of efficient bilinear interpolation of rotated pixels of FIG. 2 in accordance with embodiments of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

As stated previously, image rotation has a number of useful benefits such as in converting images between landscape and portrait orientations for display, faxing, copying, and printing purposes. However, image rotation is one of the most computationally intensive and vector unfriendly image transformations. One problem is that cartesian coordinates of rotated pixels within an image are a function of non-linear trigonometric functions. As a result, ordered memory access becomes difficult and the utilized bilinear interpolations are particularly troublesome to vectorize.

The present disclosure provides for efficient bilinear interpolation of rotated pixels in an image by combining several pixel permutations in a variety of novel ways, thereby minimizing the number of operations used to complete the calculations and simplifying the process of vectorizing.

Figure 1:
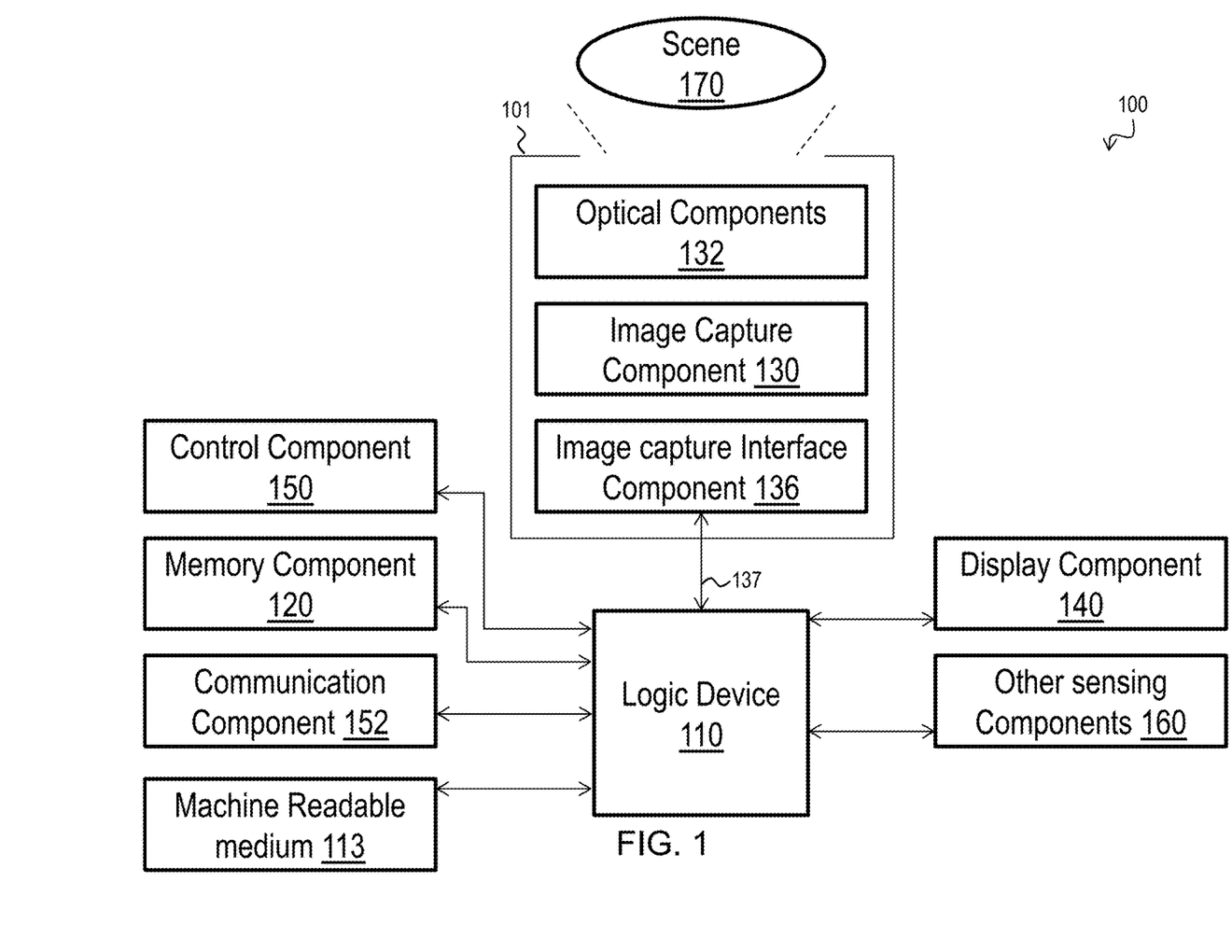
FIG. 1 illustrates a block diagram of an imaging system in accordance with an embodiment of the disclosure.

Turning now to the drawings, FIG. 1 illustrates a block diagram of an imaging system 100 in accordance with an embodiment of the disclosure. Imaging system 100 may be used to capture and process images (e.g., image frames) in accordance with techniques described herein. In some embodiments, various components of imaging system 100 may be provided in a camera component 101, such as an imaging camera. In other embodiments, one or more components of imaging system 100 may be implemented remotely from each other in a distributed fashion (e.g., networked or otherwise).

In some embodiments, imaging system 100 may be used to detect one or more gases of interest within a scene 170. For example, imaging system 100 may be configured to capture one or more images of scene 170 using camera component 101 (e.g., a thermal imaging camera) in response to infrared radiation 171 received from scene 170. Infrared radiation 171 may correspond to wavelengths that are emitted and/or absorbed by a gas 172 within scene 170, and other wavelengths that are emitted and/or absorbed by a background portion 173 of scene 170.

Captured images may be received by a logic device 110 and stored in a memory component 120. Logic device 110 may be configured to process the captured images in accordance with gas detection techniques discussed herein.

In some embodiments, imaging system 100 includes logic device 110, a machine readable medium 113, a memory component 120, image capture component 130, filters 131 (e.g., implemented by at least two sets of alternating filters 131A and 131B further discussed herein), optical components 132 (e.g., one or more lenses configured to receive infrared radiation 171 through an aperture 134 in camera component 101), an image capture interface component 136, a display component 140, a control component 150, a communication component 152, and other sensing components 160.

In some embodiments, imaging system 100 may be implemented as an imaging camera, such as camera component 101, to capture images, for example, of scene 170 (e.g., a field of view). In some embodiments, camera component 101 may include image capture component 130, optical components 132, and image capture interface component 136 housed in a protective enclosure. Imaging system 100 may represent any type of camera system which, for example, detects electromagnetic radiation (e.g., infrared radiation 171) and provides representative data (e.g., one or more still images or video images). For example, imaging system 100 may represent a camera component 101 that is directed to detect infrared radiation and/or visible light and provide associated image data.

In some embodiments, imaging system 100 may include a portable device and may be implemented, for example, coupled to various types of vehicles (e.g., an automobile, a truck, or other land-based vehicles). Imaging system 100 may be implemented with camera component 101 at various types of fixed scenes (e.g., automobile roadway, train railway, or other scenes) via one or more types of structural mounts. In some embodiments, camera component 101 may be mounted in a stationary arrangement to capture repetitive thermal images of scene 170.

In some embodiments, logic device 110 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of processing device and/or memory to execute instructions to perform any of the various operations described herein. Logic device 110 is configured to interface and communicate with the various components illustrated in FIG. 1 to perform method and processing steps as described herein. In various embodiments, it should be appreciated that processing operations and/or instructions may be integrated in software and/or hardware as part of logic device 110, or code (e.g., software or configuration data) which may be stored in memory component 120. Embodiments of processing operations and/or instructions disclosed herein may be stored by machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information). In various embodiments, as described herein, instructions provide for real time applications of processing various images of scene 170.

In some embodiments, memory component 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, logic device 110 is configured to execute software stored in memory component 120 and/or machine readable medium 113 to perform various methods, processes, and operations in a manner as described herein.

In some embodiments, image capture component 130 may include an array of sensors (e.g., any type visible light, infrared, or other type of detector) for capturing images of scene 170. In one embodiment, the sensors of image capture component 130 provide for representing (e.g., converting) a captured images of scene 170 as digital data (e.g., via an analog-to-digital converter included as part of the sensor or separate from the sensor as part of imaging system 100). As further discussed herein, image capture component 130 may be implemented as an array of infrared sensors having at least two different types of filters distributed among the various sensors of the array.

In some embodiments, logic device 110 may be configured to receive images from image capture component 130, process the images, store the original and/or processed images in memory component 120, and/or retrieve stored images from memory component 120. In various aspects, logic device 110 may be remotely positioned, and logic device 110 may be configured to remotely receive images from image capture component 130 via wired or wireless communication with image capture interface component 136, as described herein. Logic device 110 may be configured to process images stored in memory component 120 to provide images (e.g., captured and/or processed images) to display component 140 for viewing by a user.

In some embodiments, display component 140 may include an image display device (e.g., a liquid crystal display (LCD)) or various other types of generally known video displays or monitors. Logic device 110 may be configured to display image data and information on display component 140. Logic device 110 may be configured to retrieve image data and information from memory component 120 and display any retrieved image data and information on display component 140. Display component 140 may include display electronics, which may be utilized by logic device 110 to display image data and information. Display component 140 may receive image data and information directly from image capture component 130 via logic device 110, or the image data and information may be transferred from memory component 120 via logic device 110.

In some embodiments, control component 150 may include a user input and/or interface device having one or more user actuated components, such as one or more push buttons, slide bars, rotatable knobs or a keyboard, that are configured to generate one or more user actuated input control signals. Control component 150 may be configured to be integrated as part of display component 140 to operate as both a user input device and a display device, such as, for example, a touch screen device configured to receive input signals from a user touching different parts of the display screen. Logic device 110 may be configured to sense control input signals from control component 150 and respond to any sensed control input signals received therefrom.

In some embodiments, control component 150 may include a control panel unit (e.g., a wired or wireless handheld control unit) having one or more user-activated mechanisms (e.g., buttons, knobs, sliders, or others) configured to interface with a user and receive user input control signals. In various embodiments, it should be appreciated that the control panel unit may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

In some embodiments, control component 150 may include a graphical user interface (GUI), which may be integrated as part of display component 140 (e.g., a user actuated touch screen), having one or more images of the user-activated mechanisms (e.g., buttons, knobs, sliders, or others), which are configured to interface with a user and receive user input control signals via the display component 140. As an example for one or more embodiments as discussed further herein, display component 140 and control component 150 may represent appropriate portions of a tablet, a laptop computer, a desktop computer, or other type of device.

In some embodiments, logic device 110 may be configured to communicate with image capture interface component 136 (e.g., by receiving data and information from image capture component 130). Image capture interface component 136 may be configured to receive images from image capture component 130 and communicate the images to logic device 110 directly or through one or more wired or wireless communication components (e.g., represented by connection 137) in the manner of communication component 152 further described herein. Camera component 101 and logic device 110 may be positioned proximate to or remote from each other in various embodiments.

In some embodiments, imaging system 100 may include one or more other types of sensing components 160, including environmental and/or operational sensors, depending on the sensed application or implementation, which provide information to logic device 110 (e.g., by receiving sensor information from each sensing component 160). In various embodiments, other sensing components 160 may be configured to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), rotation (e.g., a gyroscope), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 160 may include devices that relay information to logic device 110 via wireless communication. For example, each sensing component 160 may be configured to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In some embodiments, communication component 152 may be implemented as a network interface component (NIC) configured for communication with a network including other devices in the network. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication component 152 may include an antenna coupled thereto for wireless communication purposes. In other embodiments, the communication component 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Figure 2:
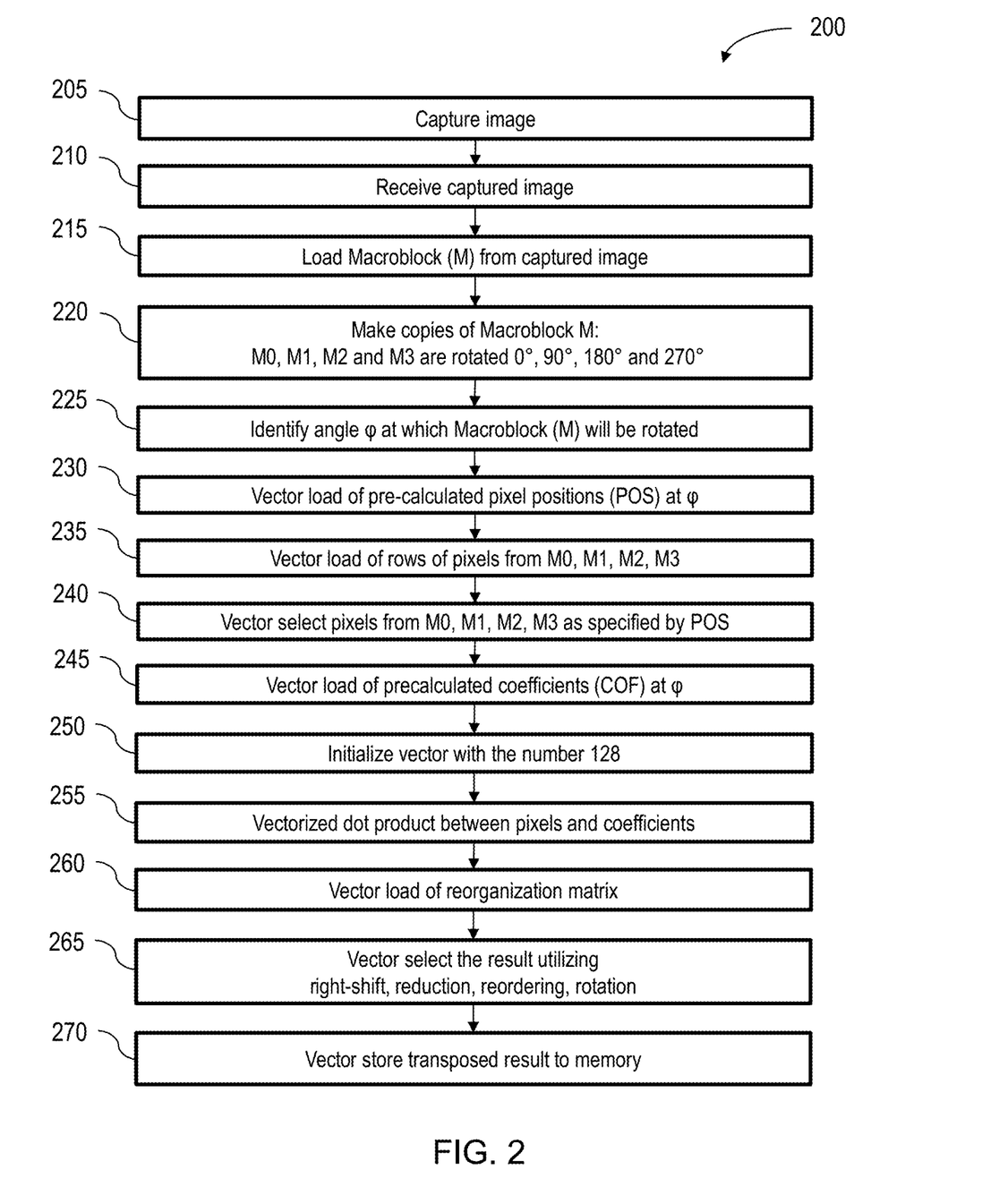
FIG. 2 illustrates a process of efficient bilinear interpolation of rotated pixels that may be performed by logic device of imaging system in accordance with embodiments of the disclosure.

FIG. 2 illustrates process 200 of efficient bilinear interpolation of rotated pixels that may be performed by logic device 110 of imaging system 100 in accordance with an embodiment of the disclosure and FIG. 3 illustrates an exemplary sequence of instructions associated with the process of efficient bilinear interpolation of rotated pixels of FIG. 2 in accordance with embodiments of the disclosure. Thus, in the following, the particular processes performed by logic device 110 in association the various blocks FIG. 2 are referenced to the corresponding sequence of operations in FIG. 3. In some of the illustrative embodiments, a macroblock may be a rectangular (e.g., also including a square as a subset of a rectangle) group of pixels of an image (e.g., a subset of pixels of the image). In some cases, the size of a macroblock in pixels may be 8×8, 16×16, 32×32, 64×64, or the like. The pixels may be stored in the macroblock in a raster-scan order before processing takes place to reduce memory traffic. In one illustrative embodiment, logic device 110 efficiently rotates a selected portion (e.g., also referred to as a selected macroblock or selected macroblock portion) of a larger macroblock. For example, a selected portion of size 8×8 may be rotated, wherein the selected portion is a subset of a larger macroblock of size 16×16. However, it will be appreciated that the process performed by logic device 110 may be generalized to macroblocks of any size, without departing from the spirit and scope of the invention.

Thus, in block 205, image capture component 130 captures an image of scene 170 and, in block 210, logic device 110 receives the captured image from the image capture component 130 through the image capture interface component 132.

Figure 4:
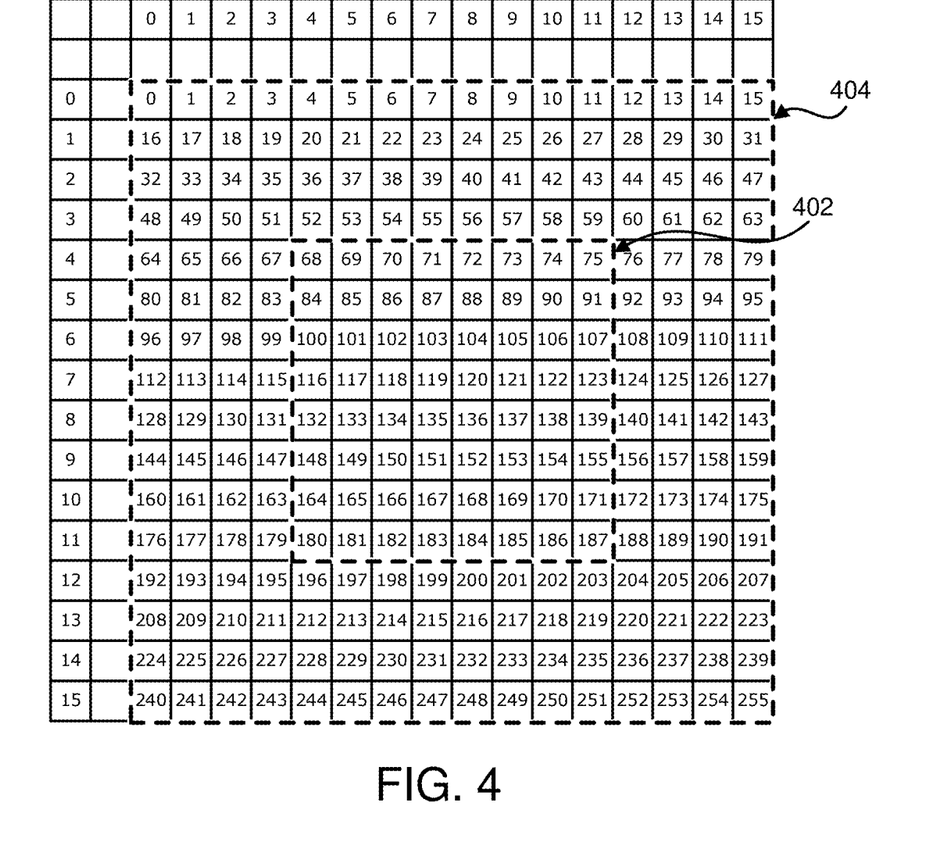
FIG. 4 illustrates a selected portion of a macroblock in accordance with an embodiment of the disclosure.

In block 215, logic device 110 loads a macroblock (M) from the received captured image. For example, the identified macroblock may be a rectangular subset of the pixels of the image. In block 220, logic device 110 makes copies of the macroblock (M) creating four copies of macroblock (M), i.e. macroblocks M0, M1, M2, and M3, and rotates macroblocks M1, M2, and M3 such that macroblock M0 is at 0° rotation, Macroblock M1 is rotated by 90°, macroblock M2 is rotated 180°, and macroblock M3 is rotated 270°. The "perpendicular" rotations in block 220 represent a negligible computational overhead as these may be implemented utilizing a small number of efficient interleave and/or deinterleave vector instructions—it is well known that bilinear interpolations are not required to transpose or flip a macroblock. For example, FIG. 4 illustrates a macroblock (M) 404 (e.g., 16×16 pixels) with a selected portion, i.e. smaller macroblock, 402 (e.g., 8×8 pixels) in accordance with an embodiment of the disclosure. To enable efficient vectorization, in block 225, logic device 110 identifies a rotation angle φ at which the selected portion 402 is rotated. Logic device 110 may identify the rotation angle Y from a device such as gyroscope.

Figure 5:
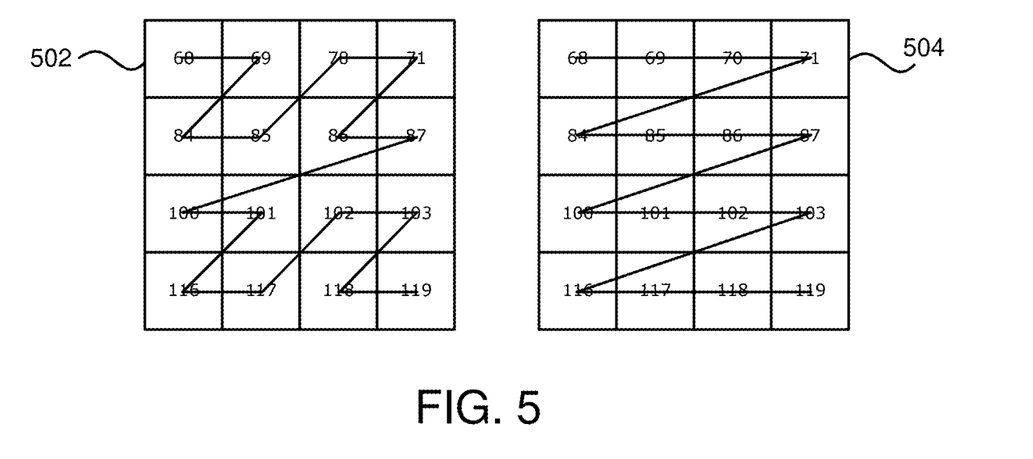
FIG. 5 illustrates a repetition of a process for pixels in a macroblock in a zigzag manner in accordance with an embodiment of the disclosure.

In block 230, logic device 110 performs a vector load of pre-calculated pixel positions (POS) at the identified rotation angle φ. That is, using the identified rotation angle φ from block 225, logic device 110 determines the positions (POS) of the pixels for this particular rotation angle φ. Utilizing a precomputed table with the positions (POS) as a function all integer (in degrees) rotation angles φ. In bilinear interpolation, each destination pixel requires 4 input pixels, thus 4 destination pixels requires 16 source pixels. Hence, logic device 110 loads a contiguous vector of altogether 16 positions. Due to symmetry, the four position vectors POS[0], POS[1], POS[2] an POS[3] may be reused for M0, M1, M2 and M3. The pixel positions are identified in a zigzag manner as is shown in FIG. 5 in accordance with an embodiment of the disclosure, to ensure that the group of four pixels do not require more than four 16-byte rows from the 16×16 macroblock.

Figure 6:
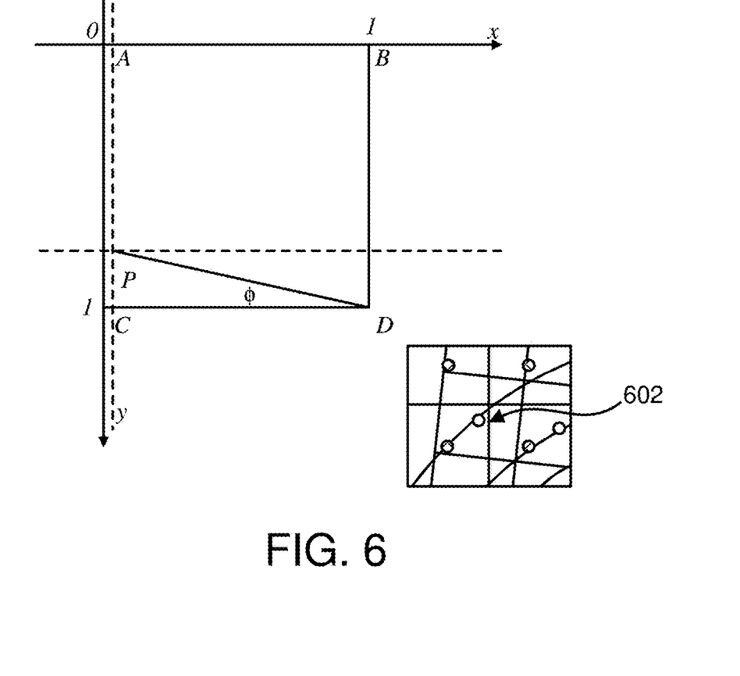
FIG. 6 illustrates calculation of a pixel position for pixel in accordance with an embodiment of the disclosure.

In accordance with one embodiment, the precomputed table of pixel positions (POS) are identified as follows with reference to FIG. 6 that illustrates calculation of a pixel position for pixel 602 in accordance with an embodiment of the disclosure. As seen in FIG. 6, A is at (0,0), B is at (1,0), C is at (0,1), D is at (1,1), and the select pixel (P) is at (x, y). Consider the bilinear interpolation equation for the pixel P at position (x, y):

$$P = \frac{[A_{cof} \cdot A + B_{cof} \cdot B + C_{cof} \cdot C + D_{cof} \cdot D + 128]}{256}$$

where, A, B, C and D are the pixels closest to P and:

$A_{cof} = 256 \cdot (1-x)(1-y)$ $B_{cof} = 256 \cdot x \cdot (1-y)$ $C_{cof} = 256 \cdot y \cdot (1-x)$ $D_{cof} = 256 \cdot x \cdot y$ In the case with 0° of rotation angle relative to D, the (x, y) coordinates of P are x=0 and y=1. In this particular case, the coefficients become:

$A_{cof} = 256 \cdot (1-0)(1-1) = 0$ $B_{cof} = 256 \cdot 0 \cdot (1-1) = 0$ $C_{cof} = 256 \cdot 1 \cdot (1-0) = 256$ $D_{cof} = 256 \cdot 0 \cdot 1 = 0$ Thus, the bilinear interpolation equation can be written:

$$P = \frac{[0 \cdot A + 0 \cdot B + 256 \cdot C + 0 \cdot D + 128]}{256}$$

$$P = \frac{[256 \cdot C + 128]}{256} = C + \frac{1}{2}$$

$P = C$ (Since 1/2 is rounded towards zero)

For this particular case, the interpolated pixel P simply becomes the C-pixel since this pixel has the same coordinate as the C-pixel.

When the rotation angle is 1°, the pre-calculated interpolation coefficients are:

$A_{cof} = 15$ $B_{cof} = 1$ $C_{cof} = 226$ $D_{cof} = 15$

And the bilinear interpolation equation then becomes:

$$P = \frac{[15 \cdot A + 1 \cdot B + 226 \cdot C + 15 \cdot D + 128]}{256}$$

Observe that a rotation of 1° leads to an equation that involves all four pixels, but the resulting pixel P is influenced the most by the C pixel since P is very close to C, as illustrated in FIG. 6.

For sufficiently small rotation angles: 0°, 1°, 2°, . . . and so on, the same pixels A, B, C and D are required to calculate the interpolated pixel P. As the rotation angle is increased further, however, other pixels will be involved in the calculations. Therefore, the following is introduced:

$$A \to p[A_{pos}]$$

$$B \to p[B_{pos}]$$

$$C \to p[C_{pos}]$$

$$D \to p[D_{pos}]$$

As noted, the coordinates of the pixels A, B, C and D required to calculate the pixel P may vary with the rotation angle. Therefore, the formula may be written as:

$$P = \frac{[A_{cof} \cdot p[A_{pos}] + B_{cof} \cdot p[B_{pos}] + C_{cof} \cdot p[C_{pos}] + D_{cof} \cdot p[D_{pos}] + 128]}{256}$$

Then, to proceed, logic device 110 simply performs a lookup the coefficients and the positions from pre-calculated tables and ends up with an equation like this:

$$P = \frac{[A_{cof} \cdot A + B_{cof} \cdot B + C_{cof} \cdot C + D_{cof} \cdot D + 128]}{256}$$

where A, B, C and D are the required pixels to calculate P. For example, for a rotation to equal 45°, the coefficients are:

$$A_{cof} = 58$$

$$B_{cof} = 58$$

$$C_{cof} = 70$$

$$D_{cof} = 70,$$

and the positions are:

$$A_{pos} = 39$$

$$B_{pos} = 40$$

$$C_{pos} = 55$$

$$D_{pos} = 56.$$

Note that the positions are not directly involved in the calculations, only indirectly. That is, logic device 110 uses the pre-calculated positions to lookup the pixels from the image. So, using the positions $A_{pos}$, $B_{pos}$, $C_{pos}$ and $D_{pos}$, the pixels A, B, C, D required to calculate P. Consequently, the meaning of the expression $p[A_{pos}]$ is the A-pixel at the $A_{pos}$ location. In the case with 0° of rotation angle, only one of the pixels is required to determine the value of P, but the formula will still work as already explained, since the other 3 pixels are multiplied with a zero coefficient.

As shown in FIG. 5, first, logic device 110 rotate pixels [68, 68, 84, 85], then [70, 71, 86, 87], next [100, 101, 116, 117], and finally [102, 103, 118, 119]. The zigzag pattern ensures that the group of four pixels do not require more than four 16-byte rows from the 16×16 macroblock. When the macroblock is rotated 450 this assumption holds for the zigzag pattern 502 but not for traditional raster-scan pattern 504 that may require five 16-byte rows for a group of four pixels. Using Arm ASIMD instruction syntax, the following may be written as:

$q[0][0]$=TBL(\{$Q0[3],Q0[4],Q0[5]$\},POS[0])

$q[0][1]$=TBL(\{$Q0[3],Q0[4],Q0[5]$\},POS[1])

$q[0][2]$=TBL(\{$Q0[5],Q0[6],Q0[7]$\},POS[2])

$q[0][3]$=TBL(\{$Q0[5],Q0[6],Q0[7]$\},POS[3])

$q[0][0]$=UDOT(128,$q[0][0]$,COF[0])

$q[0][1]$=UDOT(128,$q[0][1]$,COF[1])

$q[0][2]$=UDOT(128,$q[0][2]$,COF[2])

$q[0][3]$=UDOT(128,$q[0][3]$,COF[3]).

As shown, the first two groups of four pixels [68, 68, 84, 85] and [70, 71, 86, 87] require rows 3, 4, and 5 in the 16×16 macroblock \{$Q0[3], Q0[4], Q0[5]$\} and the second two groups of four pixels [100,101,116, 117] and [102, 103, 118, 119] require rows 5, 6, and 7 in the 16×16 macroblock \{$Q0[5], Q0[6], Q0[7]$\}, which agrees with the first quadrant in the 8×8 macroblock rotated in FIG. 5, and thus, rows 3, 4, 5, 6, 7 are involved in the calculations.

A major advantage of this procedure is that the positions (POS) and the coefficients (COF) may be reused for the next quadrants Q1, Q2, and Q3. That is, the following may be written as:

$q[1][0]$=TBL(\{$Q1[3],Q1[4],Q1[5]$\},POS[0])

$q[1][1]$=TBL(\{$Q1[3],Q1[4],Q1[5]$\},POS[1])

$q[1][2]$=TBL(\{$Q1[5],Q1[6],Q1[7]$\},POS[2])

$q[1][3]$=TBL(\{$Q1[5],Q1[6],Q1[7]$\},POS[3])

$q[1][0]$=UDOT(128,$q[1][0]$,COF[0])

$q[1][1]$=UDOT(128,$q[1][1]$,COF[1])

$q[1][2]$=UDOT(128,$q[1][2]$,COF[2])

$q[1][3]$=UDOT(128,$q[1][3]$,COF[3])

Thus, logic device 110 reduces the size of the tabulated positions (POS) and coefficients (COF) by a factor of four and are then able to reuse the registers holding the positions (POS) and coefficients (COF) for all four quadrants, reducing the number of memory load operations also by a factor of four. One advantage is that the 16 TBL ASIMD instructions are all independent as are the 16 unsigned dot product (UDOT) ASIMD instructions. This means optimal instruction level parallelism as they may all be calculated simultaneously. In practice, this may not the be case, for current generation Arm Cortex processors, usually only two ASIMD instructions are being executed in parallel, which may change with newer processors that may be able to execute up to four ASIMD instructions simultaneously. In such an instance, the bilinear interpolations in each quadrant may be completed in just two steps, one step for the four TBL instructions and another step for the four UDOT instructions. While Arm TBL instructions have been criticized for being computationally expensive, a latency of 12 and 15 cycles for TBL instructions using 3 and 4 128-bit source registers, respectively, does not represent a problem since the illustrative embodiment have 16 consecutive and independent TBL instructions, in which case the total latency becomes approximately only 2×16=32 cycles, since the throughput of this instruction is 2 cycles.

In block 235, logic device 110 performs a vector load of rows of pixels from M0, M1, M2, and M3, the pixels being actual pixels from the received captured image in block 210. Having preloaded a rectangular 16×16 macroblock M of pixels in block 215, logic device 110 simply load several rows of 16 pixels from the loaded macroblock M. Fortunately, logic device 110 does not require more than 4 such rows of 16 pixels, which is required to please the limitations of TBL instructions that cannot handle more than 64 consecutive bytes as input. In some embodiments, where the rotation angle φ is further away from 45, logic device 110 only needs to load 3 rows of 16 pixels. However, for rotation angles φ near 45°, logic device 110 is required to load 4 rows of 16 pixels. To be able to reuse positions (POS) and coefficients (COF) for all four quadrants, logic device 110 utilizes transposed and/or flipped copies of the macroblock M, i.e. macroblocks M0, M1, M2 and M3 rotated at 0°, 90°, 180° and 270°, respectively.

In block 240, logic device 110 performs a vector selection of pixels from M0, M1, M2, M3 as specified by the four position vectors POS[0], POS[1], POS[2] an POS[3]. Applying the TBL instructions with the pixels from block 235 and the four position vectors POS[0], POS[1], POS[2] an POS [3] from block 230 as input, logic device 110 utilizes a set of TBL instructions that each return 16 pixels, or 4 groups of 4 pixels, as required by the UDOT instruction that calculates the dot product between two vectors with 4 groups of 4 bytes.

In block 245, logic device 110 performs a vector load of precalculated coefficients (COF) at the rotation angle φ. Utilizing a precomputed tabulated coefficient table with the coefficients as a function of all integer (in degrees) rotation angles φ, logic device 110 loads the required coefficients from the tabulated coefficient table. Since these tabulated pixels positions (POS) in block 230 were identified in a zigzag manner as shown in FIG. 5, logic device 110 identifies the required coefficients in the same manner to ensure that the tabulated coefficients (COF) are aligned with the tabulated positions (POS).

In block 250, logic device 110 initializes the vector with the number 128. That is, by calculating the vector dot product between 4 pixels and 4 coefficients of unsigned bytes, logic device 110 needs to add 128 "one half" to ensure proper rounding. By adding 128, logic device 110 distributes the number 128 to four 32-bit elements in a 128 bit (16-byte vector) [128, 128, 128, 128].

In block 255, logic device 110 generates vectorized dot products between pixels and coefficients. That is, logic device 110 simply multiplies pixels from block 240 with the coefficients from block 245 and adds 128 from block 250 for four groups of 4 pixels and 4 coefficients.

In block 260, logic device 110 performs a vector load of a reorganization matrix (RM) from memory given as:

$$RM = \begin{bmatrix} 1 & 5 & 17 & 21 & 9 & 13 & 25 & 29 & 33 & 37 & 49 & 53 & 41 & 45 & 57 & 61 \\ 41 & 33 & 9 & 1 & 45 & 37 & 13 & 5 & 57 & 49 & 25 & 17 & 61 & 53 & 29 & 21 \\ 21 & 29 & 53 & 61 & 17 & 25 & 49 & 57 & 5 & 13 & 37 & 45 & 1 & 9 & 33 & 41 \\ 61 & 57 & 45 & 41 & 53 & 49 & 37 & 33 & 29 & 25 & 13 & 9 & 21 & 17 & 5 & 1 \end{bmatrix}.$$

In block 265, logic device 110 performs a vector select of a result utilizing right-shift, reduction, reordering, rotation. That is, the dot product in block 255 returns a disorganized vector of bytes that includes all the desired calculation results. Therefore, logic device 110 needs to (1) down-convert the results from 32-bit integer to 8-bit integer, (2) reduce the size of the vector from 64 bytes to 16 bytes as the 16 8-bit pixels require 16 bytes storage only, (3) de-zigzag the result to account for the zigzagging of the positions and the coefficients in blocks 230, 235, 240, and 245, and (4) back-rotate the pixels in quadrants associated macroblocks M1, M2, and M3 since the macroblocks M1, M2 and M3 have been rotated 90°, 180° and 270°, respectively. Fortunately, logic device 110 utilizing the reorganization matrix (RM) loaded in block 260 ensures the required right-shift (1), reduction (2), reordering (3) and rotation (4). Thus, utilizing the reorganization matrix (RM) loaded in block 260, logic device 110 is able to reorganize the disordered calculation results in a single step.

In block 270, logic device 110 performs a vector store a transposed result to memory. At this point, the bilinearly interpolated pixels for the four quadrants are stored in separate vectors with 16 elements. Logic device 110 transposes or deinterleaves these separate vectors with 16 elements and store the result back to memory. The result from the first quadrant is being deinterleaved with the result from the second quadrant, and the result from the third quadrant is being deinterleaved with the result from the fourth quadrant utilizing the deinterleave store instruction ST2. This is illustrated in FIG. 7.

Figure 7:
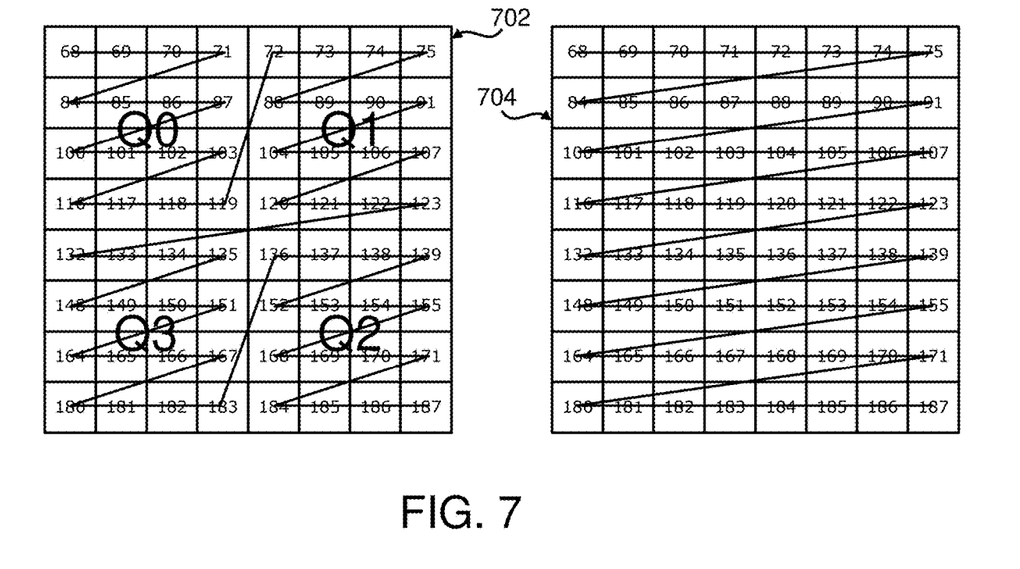
FIG. 7 illustrates actual and preferred raster-scan orders in accordance with an embodiment of the disclosure.

FIG. 7 illustrates the actual raster-scan order 702 and the preferred raster-scan order 704 in accordance with an embodiment of the disclosure. In some embodiments, logic device 110 utilizes an ARM ASIMD instruction set that simultaneously stores and de-interleaves 128-bit vectors. Thus, logic device 110 may achieve the desired storage order using two de-interleave ST2 instructions that operate on two 128-bit vectors with four 32-bit integers each:

$ST2(dst+0,\{Q0,Q1\})$ $ST2(dst+8,\{Q3,Q2\})$.

Here dst is the destination address in memory for the macroblock. Finally, logic device recognizes that the number of tabulated positions and coefficients may be further reduced by another factor of four by rotating the quadrants, such that:

Rotation [0°-90°]:$Q0,Q1,Q2,Q3$

Rotation [90°-180°]:$Q1,Q2,Q3,Q0$

Rotation [180°-270°]:$Q2,Q3,Q0,Q1$

Rotation [270°-0°]:$Q3,Q0,Q1,Q2$.

Thus, logic device 110 provides for efficient bilinear interpolation of rotated pixels in an image by combining several mandatory pixel permutations based on a given rotation angle in a variety of novel ways, thereby minimizing the number of operations used to complete the calculations and simplifying the process of vectorizing. That is, the bilinear interpolation of the illustrative embodiments reduces the size of the tabulated positions (POS) and coefficients (COF), reuses registers holding the positions (POS) and coefficients (COF), reduces the number of memory load operations, reduces the number of instructions utilized, and improves storage ordering, thereby simplifying the process of vectorizing. It should be noted that the bilinear interpolation previously described may be utilized, i.e., repeated, for additional selected portions of an image specific to those portions that require rotation to achieve color continuity, clearer image, etc.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   identifying a rotation angle for an input image comprising first pixels; and
   determining second pixels of a rotated image obtained by rotating the input image by the rotation angle;
   wherein for at least a block of pixels, determining the second pixels in the block comprises a bilinear interpolation of each second pixel in the block from corresponding first pixels, the bilinear interpolation comprising a bilinear interpolation process performed to determine a plurality of the second pixels, the bilinear interpolation process comprising:
   performing a vector load of pixel positions from which the plurality of the second pixels will be interpolated, the pixel positions being at least partially defined by the rotation angle;
   performing a vector load of rows of first pixels associated with the pixel positions;
   performing a vector selection of a subset of pixels from the rows of first pixels based on the pixel positions;
   performing a vector load of a set of interpolation coefficients at least partially defined by the rotation angle; and
   applying the set of interpolation coefficients to the subset of pixels to determine the plurality of the second pixels.

2. The method of claim 1, wherein:
   the plurality of the second pixels is a first plurality of the second pixels;
   the method further comprises determining a second plurality of the second pixels, wherein determining the second plurality comprises a rotation-interpolation process comprising:
   performing the bilinear interpolation process on a copy of the block, the copy being rotated by a first angle of 90°, 180°, or 270°, wherein the bilinear interpolation process on the copy reuses the pixel positions and the interpolation coefficients used for the first plurality of the second pixels; and
   back-rotating the second plurality of the second pixels by the first angle.

3. The method of claim 2, wherein:
   determining the second plurality is performed for the first angle of 90°; and
   the method further comprises:
   determining a third plurality of the second pixels by performing the rotation-interpolation process for the first angle of 180°; and
   determining a fourth plurality of the second pixels by performing the rotation-interpolation process for the first angle of 270°;
   wherein each of the first, second, third, and fourth pluralities of the second pixels is a respective quadrant of the block.

4. The method of claim 1, wherein the subset of pixels from the rows of first pixels are selected based on adjacency with the pixel positions.

5. The method of claim 1, wherein the subset of pixels from the rows of first pixels are identified utilizing a first set of instructions that are a set of table (TBL) instructions.

6. The method of claim 1, wherein the vector selection of the subset of pixels from the rows of first pixels based on the identified pixel positions comprises:
   utilizing a set of table (TBL) instructions that each return pixels within the subset of pixels as required by a UDOT instruction that calculates a dot product between two vectors with 4 groups of 4 bytes.

7. The method of claim 6, wherein the dot product is between two vectors with four groups of four bytes.

8. The method of claim 6, wherein dot products for the set of TBL instructions are determined simultaneously utilizing an Advanced RISC Machines (Arm) Advanced Single Instruction, Multiple Data (ASIMD) instruction that provides efficient dot product UDOT instructions.

9. The method of claim 1, wherein the vector load of the pixel positions and the vector load of the set of interpolation coefficients are performed utilizing a zigzag pattern.

10. The method of claim 1, further comprising:
    performing a vector select of a result utilizing a reorganization matrix (RM) that ensures right-shift, reduction, reordering, and rotation thereby forming a transposed result; and
    performing a vector store of the transposed result to memory.

11. A system comprising:
    a memory component storing machine-executable instructions; and
    a logic device configured to execute the instructions to cause the system to:
    identify a rotation angle for an input image comprising first pixels; and
    determine second pixels of a rotated image obtained by rotating the input image by the rotation angle;
    wherein for at least a block of pixels, determining the second pixels in the block comprises a bilinear interpolation of each second pixel in the block from corresponding first pixels, the bilinear interpolation comprising a bilinear interpolation process performed to determine a plurality of the second pixels, the bilinear interpolation process comprising:
    performing a vector load of pixel positions from which the plurality of the second pixels will be interpolated, the pixel positions being at least partially defined by the rotation angle;

performing a vector load of rows of first pixels associated with the pixel positions;
performing a vector selection of a subset of pixels from the rows of first pixels based on the pixel positions;
performing a vector load of a set of interpolation coefficients at least partially defined by the rotation angle; and
applying the set of interpolation coefficients to the subset of pixels to determine the plurality of the second pixels.

12. The system of claim 11, wherein:
the plurality of the second pixels is a first plurality of the second pixels;
the logic device is further configured to determine a second plurality of the second pixels, wherein determining the second plurality comprises a rotation-interpolation process comprising:
performing the bilinear interpolation process on a copy of the block, the copy being rotated by a first angle of 90°, 180°, or 270°, wherein the bilinear interpolation process on the copy reuses the pixel positions and the interpolation coefficients used for the first plurality of the second pixels; and
back-rotating the second plurality of the second pixels by the first angle.

13. The system of claim 12, wherein:
determining the second plurality is performed for the first angle of 90°; and
the logic device is further configured to:
determine a third plurality of the second pixels by performing the rotation-interpolation process for the first angle of 180°; and
determine a fourth plurality of the second pixels by performing the rotation-interpolation process for the first angle of 270°;

wherein each of the first, second, third, and fourth pluralities of the second pixels is a respective quadrant of the block.

14. The system of claim 11, wherein the subset of pixels from the rows of first pixels are selected based on adjacency with the pixel positions.

15. The method of claim 11, wherein the subset of pixels from the rows of first pixels are identified utilizing a first set of instructions that are a set of table (TBL) instructions.

16. The method of claim 11, wherein the vector selection of the subset of pixels from the rows of first pixels based on the identified pixel positions comprises:
utilizing a set of table (TBL) instructions that each return pixels within the subset of pixels as required by a UDOT instruction that calculates a dot product between two vectors with 4 groups of 4 bytes.

17. The system of claim 16, wherein the dot product is between two vectors with four groups of four bytes.

18. The system of claim 16, wherein dot products for the set of TBL instructions are determined simultaneously utilizing an Advanced RISC Machines (Arm) Advanced Single Instruction, Multiple Data (ASIMD) instruction that provides efficient dot product UDOT instructions.

19. The system of claim 11, wherein the vector load of the pixel positions and the vector load of the set of interpolation coefficients are performed utilizing a zigzag pattern.

20. The method of claim 11, wherein the logic device is further configured to execute the instructions to cause the system to:
perform a vector select of a result utilizing a reorganization matrix (RM) that ensures right-shift, reduction, reordering, and rotation thereby forming a transposed result; and
perform a vector store of the transposed result to memory.

* * * * *